United States Patent [19]

Petrak et al.

[11] 3,992,214

[45] Nov. 16, 1976

[54] REFRACTORY CASTABLE

[75] Inventors: Daniel Ralph Petrak, Irwin, Pa.;
Thomas Franklin Foltz, Westboro, Mass.

[73] Assignee: Dresser Industries, Inc., Dallas, Tex.

[22] Filed: Aug. 14, 1974

[21] Appl. No.: 497,443

[52] U.S. Cl. .................................... 106/65; 106/64; 106/67; 106/44; 106/104
[51] Int. Cl.² ................. C04B 35/44; C04B 35/02; C04B 33/00; C04B 35/52
[58] Field of Search ................... 106/64, 67, 65, 44, 106/104

[56] References Cited
UNITED STATES PATENTS

| | | | |
|---|---|---|---|
| 2,874,071 | 2/1959 | Kadisch et al. | 106/64 X |
| 3,164,482 | 1/1965 | Renkey | 106/64 X |
| 3,164,483 | 1/1965 | McCreight et al. | 106/65 X |
| 3,223,539 | 12/1965 | Hyde et al. | 106/65 X |
| 3,718,489 | 2/1973 | Crookston et al. | 106/65 X |

Primary Examiner—Winston A. Douglas
Assistant Examiner—William G. Wright
Attorney, Agent, or Firm—Raymond T. Majesko; John N. Hazelwood

[57] ABSTRACT

This invention relates to refractory castables containing a heat resistant aggregate and calcium aluminate cement plus the addition of +35 mesh silicon carbide wherein such castable may be used at temperatures up to 3200° F. with the required strength.

8 Claims, No Drawings

REFRACTORY CASTABLE

Castables are refractories which when mixed with water are poured like concrete. They consist of ground refractory materials containing a suitable percentage of added bonding agents. They are shipped in dry form. For use, they are blended with water to the desired consistency and then poured or tamped into place or applied by means of an air gun. Castables are especially suited for furnace linings of irregular dimensions, for patching brick work, and for casting special shapes.

Certain applications of castables, for example, linings in refinery cyclones, where operating temperatures are about 900° F. to 1500° F., require high strength and abrasion resistance in the castable. However, at these temperatures high strength ceramic bonds do not develop, but rather the bond strength of the castable is largely limited to that obtained from the cement used.

The intermediate temperature range of 500° to 2000° F. for such castable applications makes it apparent that Portland type cements are wholly unusable as the bonding material no matter how refractory the aggregates used. Castables composed of chrome ore or fused or calcined high alumina materials as the aggregate and calcium aluminate cement as the bond have been used where high strength and abrasion resistance were desired. Although these castables have had a limited acceptance, products showing good properties at low and intermediate temperature ranges have been available.

Above the 2000° F. service range, some carbonaceous refractories have been suggested, but which contain very distinctive disadvantages which severely limit extensive usage. Refractories made of solid carbon and graphite materials are very expensive and are rapidly consumed in the presence of air or oxygen at high temperature. Also, they are good conductors of heat, thus undesirably permitting expensive furnace heat to be rapidly lost. A still further disadvantage is that since graphite and amorphous carbon have relatively high electrical conductivity, their use has been severely restricted in electrically heated furnaces where an insulation against current flow is of paramount importance. When carbon powder or graphite is mixed with other refractory materials in an effort to keep down costs while attempting to minimize undesirable effects such as oxidation, much is sacrificed and little is gained.

The U.S. Pat. No. 1,455,748 to Green is exemplary of prior art mixtures of carbon (or broadly, a carbonaceous material) and magnesia or silica and clay to make a refractory castable to use for lining induction furnaces. The patent to Fisher, U.S. Pat. No. 2,141,600 represented a step forward in the art over the mix of the Green patent. In essence, Fisher is directed to a magnesia refractory to which is added an amorphous carbon material, graphite, or possibly silicon carbide, a binding agent and a flux material. U.S. Pat. No. 3,164,482 to Renkey, deals with the addition to calcium aluminate containing mixes of very finely divided silicon carbide.

Generally, the maximum service temperature at which prior art castables have been usable was set in the 2700° to 2800° F. range due to excessive shrinkage and low hot modulus of rupture above these temperatures. It has now been found desirable to develop a castable composition which could withstand service temperatures as high as about 3200° F.

In accordance with this invention, the strength and volume stability at high temperatures of refractory castables comprising refractory aggregates and a calcium aluminate cement are improved by including a relatively small amount of coarse silicon carbide in the batch. A minimum of about 1 weight percent, based on the weight of the solid content of the resultant mixture is sufficient to bring about some improvement in these properties, with an amount of from 3 to 7% constituting the preferred addition. However, the silicon carbide can be added in amounts up to 10% if desired but this is not necessary. The silicon carbide should be of a +35 mesh particle size. The silicon carbide also should be screened generally to pass a 14 mesh screen.

The heat resistant cement used in producing castables for use at high temperatures as in this invention is calcium aluminate cement and comprises from about 20 to 30%, by weight, on a solids basis. Such cements are available commercially. Those used can have a CaO to $Al_2O_3$ ratio of about 1 to 4 though higher and lower ratios can be used as desired. In the example given herein, a high alumina cement was utilized. Generally, the cement is used in a size that passes a 100 mesh Tyler screen with over ½ of it being finer than 200 mesh.

The heat resistant aggregate is present in the castable in an amount of from about 60 to 79%, by weight, based on the solids content of the castable. Preferably, an aggregate such as calcined or fired alumina, calcined bauxite, calcined kyanite, calcined kaolin or combinations thereof are used. Materials such as diasporitic clay may also be used. These aggregates are preferably sized so that a preponderance is +65 mesh. Chrome ore, which would tend to react undesirably with constituents of the calcium aluminate cement and which would tend to be reduced by the silicon carbide should not be used.

The specifically sized silicon carbide is the important ingredient in the mix. By maintaining the silicon carbide at a +35 mesh particle size, it will not react to any great extent with the calcium aluminate cement to form a $SiO_2$-$Al_2O_3$-CaO low temperature melting phase as was found to occur with fine silicon carbide in these mixtures.

Table I below is exemplary of a typical and preferred size grading of particulate material for making up batch mixes according to the invention.

TABLE I

| | |
|---|---|
| Pass 4 on 10 mesh | 38% |
| Pass 10 on 28 mesh | 15% |
| Pass 28 on 65 mesh | 10% |
| −65 mesh | 37% |

EXAMPLE 1

Exemplary mixes were prepared using various size gradations for the raw materials. Mixes D and E were prepared with the same kaolin grind as Mix C and 5 and 7% silicon carbide, respectively. The properties of interest, and therefore those measured, were hot modulus of rupture up to 2500° F. and dimensional stability to 2730° F. and 3000° F. None of the variations in grind or composition had any significantly deleterious effect on hot modulus of rupture. All the finer kaolin grinds showed increased shrinkage compared to the coarse grind in Mix A after heating to 2730° and 3000° F. Increased additions of silicon carbide to 7% did slightly reduce the shrinkage when the kaolin was as fine as 65 mesh. The results are shown in Table II below.

TABLE II

| Mix Number: | A | B | C | D | E |
|---|---|---|---|---|---|
| Calcined Kaolin (4/14 mesh) | 40% | — | — | — | — |
| Calcined Kaolin (4/28 mesh) | — | 40% | — | — | — |
| Calcined Kaolin (4/65 mesh) | — | — | 40% | 40% | 40% |
| Alumina (−6 mesh) | 32 | 32 | 32 | 30 | 28 |
| CA-AL Cement | 25 | 25 | 25 | 25 | 25 |
| SiC (14/28 mesh) | 3 | 3 | 3 | 5 | 7 |
| Method of Forming: | | | Cast | | |
| Water Added, %: | 8.0 | 8.0 | 8.0 | 8.0 | 8.2 |
| Modulus of Rupture, (hot), psi | | | | | |
| At 1500° F. (Hold Time 30 Hours) (Av 3): | 1400 | 1600 | 1590 | 1160 | 1170 |
| At 2500° F. (Hold Time 5 Hours) (Av 3): | 1300 | 1140 | 1040 | 1240 | 910 |
| Dimensional Change from Dry Size After Heating 5 Hours at 2730° F. (Av 3) | | | | | |
| Linear Change, %: | −0.2 | −0.5 | −0.6 | −0.5 | −0.4 |
| Volume Change, %: | −1.5 | −2.4 | −2.0 | −2.4 | −1.5 |
| Dimensional Change from Dry Size After Heating 5 Hours at 3000° F. (Av 3) | | | | | |
| Linear Change, %: | −0.4 | −0.8 | −0.7 | −0.9 | −0.7 |
| Volume Change, %: | −2.7 | −4.0 | −4.0 | −4.5 | −3.0 |

EXAMPLE 2

A number of additional experimental mixes were prepared in the same manner as Example 1. Mix L with the addition of 5% silicon carbide (28/35 mesh) produced a satisfactory mix which had all the desired properties. Further refinements were made (Mixes M through R) to optimize the amount and grain sizing of silicon carbide. The hot modulus specimens made from Mixes M through P, all of which contained fine −35 mesh silicon carbide, slumped under their own weight at 2700° F. The coarser grain silicon carbide (28/35 mesh) used in Mixes L, Q and R gave good results in all tests. Mix Q was also heated to 3000° F. under reducing conditions to determine whether an oxidizing atmosphere was required for dimensional stability of this mix at higher temperatures. Results showed Mix Q to be stable in both oxidizing and neutral conditions. The results are shown in Table III below.

TABLE III

| Number: | L | M | N | O | P | Q | R |
|---|---|---|---|---|---|---|---|
| Mix: | | | | | | | |
| Calcined Kaolin 4/10 mesh | 40% | 40% | 40% | 40% | 40% | 40% | 40% |
| Alumina Fines −14 mesh | 30 | 30 | 30 | 32 | 34 | 32 | 28 |
| Silicon Carbide 28/35 mesh | 5 | — | — | — | — | 3 | 7 |
| Silicon Carbide 35/65 mesh | — | 5 | — | — | — | — | — |
| Silicon Carbide D.C. Fines (−65 mesh) | — | — | 5 | 3 | 3 | — | — |
| CA-AL Cement | 25 | 25 | 25 | 25 | 23 | 25 | 25 |
| Method of Forming: | | | | Cast | | | |
| Water Added, %: | 8.2 | 8.2 | 8.2 | 8.0 | 8.0 | 8.0 | 8.0 |
| Modulus of Rupture, (hot), psi | | | | | | | |
| At 1500° F. (Hold Time 30 Hrs.) (Av 3): | 1250 | 1710 | 1800 | 1780 | 1740 | 1480 | 1400 |
| At 2000° F. (Hold Time 15 Hrs.) (Av 3): | 990 | 1400 | 1430 | 1410 | 1340 | 1220 | 1160 |
| At 2500° F. (Hold Time 5 Hrs.) (Av 3): | 1010 | 820 | 490 | 530 | 530 | 1280 | 1150 |
| At 2700° F. (Hold Time 5 Hrs.) (Av 3): | 130 | | slumped | | | 170 | 50 |
| Dimensional Change from Dry Size After Heating 5 Hrs. at 2000° F. (Av 2) | | | | | | | |
| Linear Change, %: | +0.3 | +0.2 | −0.5 | 0.0 | +0.1 | +0.2 | +0.2 |
| Volume Change, %: | +1.1 | +0.5 | −0.7 | +0.3 | −0.6 | +0.9 | +0.9 |
| Dimensional Change from Dry Size After Heating 5 Hrs. at 2500° F. (Av 3) | | | | | | | |
| Linear Change, %: | −0.9 | −0.9 | −0.1 | −0.6 | −0.2 | −1.2 | −1.0 |
| Volume Change, %: | −3.1 | −3.2 | −0.4 | −1.2 | −1.2 | −3.9 | −2.9 |
| Dimensional Change from Dry Size After Heating 5 Hrs. at 2730° F. (Av 3) | | | | | | | |
| Linear Change, %: | −0.1 | +0.1 | +0.2 | −0.5 | −0.1 | −0.2 | ±0.1 |
| Volume Change, %: | −0.8 | +0.2 | ±0.3 | −1.6 | −1.6 | −1.5 | −0.5 |
| Dimensional Change from Dry Size After Heating 5 Hrs. at 3000° F. (Av 3) | | | | | | | |
| Linear Change, %: | +0.2 | +0.6 | −1.0 | −1.0 | −0.3 | −0.4 | +0.4 |
| Volume Change, %: | −0.6 | ±0.6 | −4.8 | −4.0 | −1.6 | −2.7 | ±0.4 |
| | | | | | | −0.2 | reducing |
| | | | | | | −1.2 | atmosphere |

Table IV below lists the typical chemical analyses of the materials used in the examples.

TABLE IV

| Material | Calcium Aluminate Cement | Alumina | Calcined Kaolin | Silicon Carbide |
|---|---|---|---|---|
| $SiO_2$ | 0.1% | 0.08% | 36.9% | 68.8% (Si) |
| $Al_2O_3$ | 79.0 | 99.5 | 59.5 | 0.7 |
| $TiO_2$ | — | Trace | 2.5 | 0.03 |
| $Fe_2O_3$ | 0.3 | 0.06 | 1.1 | 0.3 |
| CaO | 18.0 | Trace | 0.08 | 0.12 |
| MgO | 0.4 | Trace | 0.05 | 0.02 |
| Total Alks. | 0.5 | 0.02 | 0.12 | 0.00 |
| SiC | | | | 98.2 |
| Total Carbon | | | | 29.84 |

TABLE IV-continued

| Material | Calcium Aluminate Cement | Alumina | Calcined Kaolin | Silicon Carbide |
|---|---|---|---|---|
| Free Carbon | | | | 0.16 |

Having thus described the invention in detail and with sufficient particularity as to enable those skilled in the art to practice it, what is desired to have protected by Letters Patent is set forth in the following claims.

The embodiments of the invention in which an exclusive property or privilege is claimed are defined as follows:

1. A refractory castable consisting essentially of about 20 to 30% calcium aluminate cement, about 1 to 10% silicon carbide and the balance a heat resistant aggregate, said silicon carbide being sized such that substantially all of it is +35 mesh.

2. A castable according to claim 1 in which the silicon carbide is present in amounts between about 3 and 7%.

3. A castable according to claim 1 in which the silicon carbide sizing is −28 +35 mesh.

4. A castable according to claim 1 in which the silicon carbide sizing is −14 +28 mesh.

5. A castable according to claim 1 in which the silicon carbide sizing is −14 +35 mesh.

6. A castable according to claim 1 in which a preponderance of the heat resistant aggregate is +65 mesh.

7. A castable according to claim 1 in which the heat resistant aggregate comprises high alumina materials.

8. In refractory castables containing a heat resistant aggregate and calcium aluminate cement, the improvement comprising the addition of from about 1 to 10% +35 mesh silicon carbide.

* * * * *